US012149127B2

(12) United States Patent
Li et al.

(10) Patent No.: US 12,149,127 B2
(45) Date of Patent: Nov. 19, 2024

(54) ROTOR FOR ELECTRIC MOTOR

(71) Applicant: Aurora Flight Sciences Corporation, Manassas, VA (US)

(72) Inventors: Kang Li, Winchester, MA (US); Edward C. Lovelace, Arlington, MA (US); Wen Ouyang, Cary, NC (US)

(73) Assignee: Aurora Flight Sciences Corporation, Manassas, VA (US)

( * ) Notice: Subject to any disclaimer, the term of this patent is extended or adjusted under 35 U.S.C. 154(b) by 74 days.

(21) Appl. No.: 17/505,461

(22) Filed: Oct. 19, 2021

(65) Prior Publication Data

US 2022/0181931 A1 Jun. 9, 2022

Related U.S. Application Data

(60) Provisional application No. 63/121,681, filed on Dec. 4, 2020.

(51) Int. Cl.
*H02K 1/27* (2022.01)
*B64C 11/02* (2006.01)
(Continued)

(52) U.S. Cl.
CPC ............ *H02K 1/2786* (2013.01); *B64C 11/02* (2013.01); *B64U 30/20* (2023.01); *B64U 50/19* (2023.01); *H02K 1/2793* (2013.01); *H02K 9/06* (2013.01)

(58) Field of Classification Search
CPC ...... H02K 1/2786; H02K 1/2793; H02K 9/06; H02K 1/27; H02K 21/24; H02K 1/278;
(Continued)

(56) References Cited

U.S. PATENT DOCUMENTS 5,777,415 A * 7/1998 Suzuki ................... H02K 29/06
310/156.05
6,828,700 B2 * 12/2004 Cichetti, Sr. ........ F04D 29/5806
310/58
(Continued)

FOREIGN PATENT DOCUMENTS

CN 111130254 A * 5/2020 ........... B64C 39/024
CN 111 884 395 A 11/2020
(Continued)

OTHER PUBLICATIONS

WO-2017124783-A1, machine translation (Year: 2017).*
(Continued)

*Primary Examiner* — Tran N Nguyen
*Assistant Examiner* — Masoud Vaziri
(74) *Attorney, Agent, or Firm* — McDonnell Boehnen Hulbert & Berghoff LLP

(57) ABSTRACT

In an example, a rotor for an electric motor includes an inner hub, an outer rim, and a plurality of slats. Each slat of the plurality of slats has a first end at the inner hub and a second end at the outer rim. The rotor is configured to drive a plurality of propeller blades that provide force for an aerial vehicle. Additionally or alternatively, a rotor for an electric motor includes a housing that includes a first retaining structure and a second retaining structure that are configured to apply a force that is directed radially outward against a magnet to hold the magnet against the housing. The rotor is configured to drive a plurality of propeller blades that provide force for an aerial vehicle.

21 Claims, 17 Drawing Sheets

(51) Int. Cl.
*B64U 30/20* (2023.01)
*B64U 50/19* (2023.01)
*H02K 1/2786* (2022.01)
*H02K 1/2793* (2022.01)
*H02K 9/06* (2006.01)

(58) Field of Classification Search
CPC ...... H02K 1/28; H02K 1/2773; H02K 1/2766; H02K 1/276; B60K 7/0007; B64C 1/00; B64C 1/0009; B64C 1/06; B64C 1/061; B64C 1/062; B64C 1/063; B64C 1/064; B64C 1/065; B64C 1/068; B64C 1/069; B64C 27/08; B64C 27/10; B64C 27/20; B64C 39/00; B64C 39/001; B64C 39/003; B64C 39/005; B64C 39/006; B64C 39/008; B64C 39/02; B64C 39/024; B64C 39/029; B64U 10/00; B64U 30/21; B64U 30/24; B64U 30/26; B64U 30/27; B64U 30/29–299
See application file for complete search history.

(56) References Cited

U.S. PATENT DOCUMENTS

| | | | | |
|---|---|---|---|---|
| 6,844,646 B1* | 1/2005 | Werson | ............... | H02K 1/2791 |
| | | | | 310/156.19 |
| 7,548,006 B2* | 6/2009 | Yu | ............... | H02K 1/2791 |
| | | | | 310/156.22 |
| 7,692,348 B2* | 4/2010 | Gruenhagen | ........ | H02K 1/278 |
| | | | | 310/156.19 |
| 7,898,136 B2* | 3/2011 | Poulin | ............... | H02K 1/2791 |
| | | | | 310/156.19 |
| 9,035,527 B2* | 5/2015 | Matsuda | ........... | H02K 23/04 |
| | | | | 310/216.106 |
| 2006/0103252 A1* | 5/2006 | Yokota | ........... | H02K 21/222 |
| | | | | 310/74 |
| 2011/0291498 A1* | 12/2011 | Sakata | ............. | H02K 1/278 |
| | | | | 310/43 |
| 2013/0162090 A1* | 6/2013 | Kwok | ............... | H02K 1/30 |
| | | | | 310/156.12 |
| 2014/0292117 A1* | 10/2014 | Lee | ................ | H02K 5/203 |
| | | | | 310/54 |
| 2016/0190881 A1* | 6/2016 | Kanatani | ........... | H02K 11/33 |
| | | | | 310/156.01 |
| 2016/0344246 A1* | 11/2016 | Fraser | ............... | B60L 50/51 |
| 2017/0074272 A1* | 3/2017 | Horng | ........... | F04D 25/0606 |
| 2018/0083503 A1* | 3/2018 | Beckman | ......... | H02K 11/215 |
| 2018/0334241 A1* | 11/2018 | Long | ............... | B64C 11/20 |
| 2018/0370642 A1* | 12/2018 | Imaizumi | ........... | H02K 11/27 |
| 2019/0181701 A1* | 6/2019 | Park | ............... | B64C 27/12 |
| 2019/0193849 A1* | 6/2019 | Yu | ............... | H02K 1/2791 |
| 2019/0252938 A1* | 8/2019 | Park | ............... | B64C 25/32 |
| 2019/0252983 A1 | 8/2019 | Park | | |
| 2020/0177056 A1* | 6/2020 | Nakamura | ......... | H02K 5/203 |
| 2020/0251946 A1* | 8/2020 | Yao | ............... | H02K 1/2798 |

FOREIGN PATENT DOCUMENTS

| | | | |
|---|---|---|---|
| JP | S59 76159 A | 5/1984 | |
| WO | WO-2017124783 A1 * | 7/2017 | ............ B64D 33/10 |
| WO | WO-2018092628 A1 * | 5/2018 | ............ H02K 1/27 |

OTHER PUBLICATIONS

CN-111130254-A (Year: 2020).*
CN-111130254-A-Machine Translation (Year: 2020).*
WO 2018092628 A1 Machine Translation (Year: 2018).*
EPO-Report—EP4009496—Mar. 14, 2024 (Year: 2024).*
Extended European Search Report prepared by the European Patent Office in application No. EP 21 204 335.0 dated Apr. 13, 2022.

* cited by examiner

ROTOR FOR ELECTRIC MOTOR

CROSS REFERENCE TO RELATED APPLICATION

The present application is a non-provisional patent application claiming priority to U.S. Provisional Application No. 63/121,681, filed on Dec. 4, 2020, the contents of which are hereby incorporated by reference.

FIELD

The present disclosure generally relates to rotors for electric motors, and more specifically to rotors for electric motors that are configured to provide force for an aerial vehicle.

BACKGROUND

When a battery forces electric current though stator windings of a motor, a rotor that includes permanent magnets rotates in response to the magnetic field generated by the electric current. Additionally, heat is generated. The operating speed of such a motor is often limited by the motor's ability to dissipate the heat that is generated during operation. In addition, the permanent magnets of the rotor can become loose or displaced during operation, which can negatively affect the motor's performance. As such, a need exists for a rotor that better holds the permanent magnets in place and/or better dissipates heat.

SUMMARY

One aspect of the disclosure is a rotor for an electric motor, the rotor comprising: an inner hub; an outer rim; and a plurality of slats, wherein each slat of the plurality of slats has a first end at the inner hub and a second end at the outer rim, wherein the rotor is configured to drive a plurality of propeller blades that provide force for an aerial vehicle.

Another aspect of the disclosure is a rotor for an electric motor, the rotor comprising: a housing comprising a first retaining structure and a second retaining structure that are configured to apply a force that is directed radially outward against a magnet to hold the magnet against the housing, wherein the rotor is configured to drive a plurality of propeller blades that provide force for an aerial vehicle.

Another aspect of the disclosure is a rotor for an electric motor, the rotor comprising: a first plurality of magnets defining a plurality of gaps between the first plurality of magnets; a housing comprising a plurality of retaining structures configured to apply first forces that are directed radially outward against the first plurality of magnets to hold the first plurality of magnets against the housing; and a second plurality of magnets that are positioned within the plurality of gaps such that the first plurality of magnets are configured to apply a second force that is directed radially outward against the second plurality of magnets to hold the second plurality of magnets against the housing.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As discussed above, a need exists for a rotor that better holds permanent magnets in place and/or better dissipates heat. Within examples, a rotor for an electric motor includes an inner hub, an outer rim, and a plurality of slats. Each slat of the plurality of slats has a first end at the inner hub and a second end at the outer rim. The rotor is configured to cause rotation of a shaft driving a machine part, such as a plurality of propeller blades that provide forces, such as lift, thrust, and the like, for an aerial vehicle. In some examples, rotation of the rotor causes the plurality of slats to force air radially outward away from the rotor. This can provide a cooling effect, which can enable higher operating speeds.

That is, the rotor can generate and dissipate an increased level of heat without causing the motor to experience catastrophic overheating.

In another example, a rotor for an electric motor includes a housing comprising a first retaining structure and a second retaining structure that are configured to apply a force that is directed radially outward against a magnet to hold the magnet against the housing. The rotor is configured to drive a plurality of propeller blades that provide forces for an aerial vehicle. The first retaining structure and the second retaining structure can more reliably hold the magnet against the housing, which can yield more reliable motor performance when compared to holding the magnet in place solely with adhesive, for example.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-18 are schematic diagrams of an aerial vehicle 10, an electric motor 100, and/or a rotor 102 and related functionality.

Figure 1:
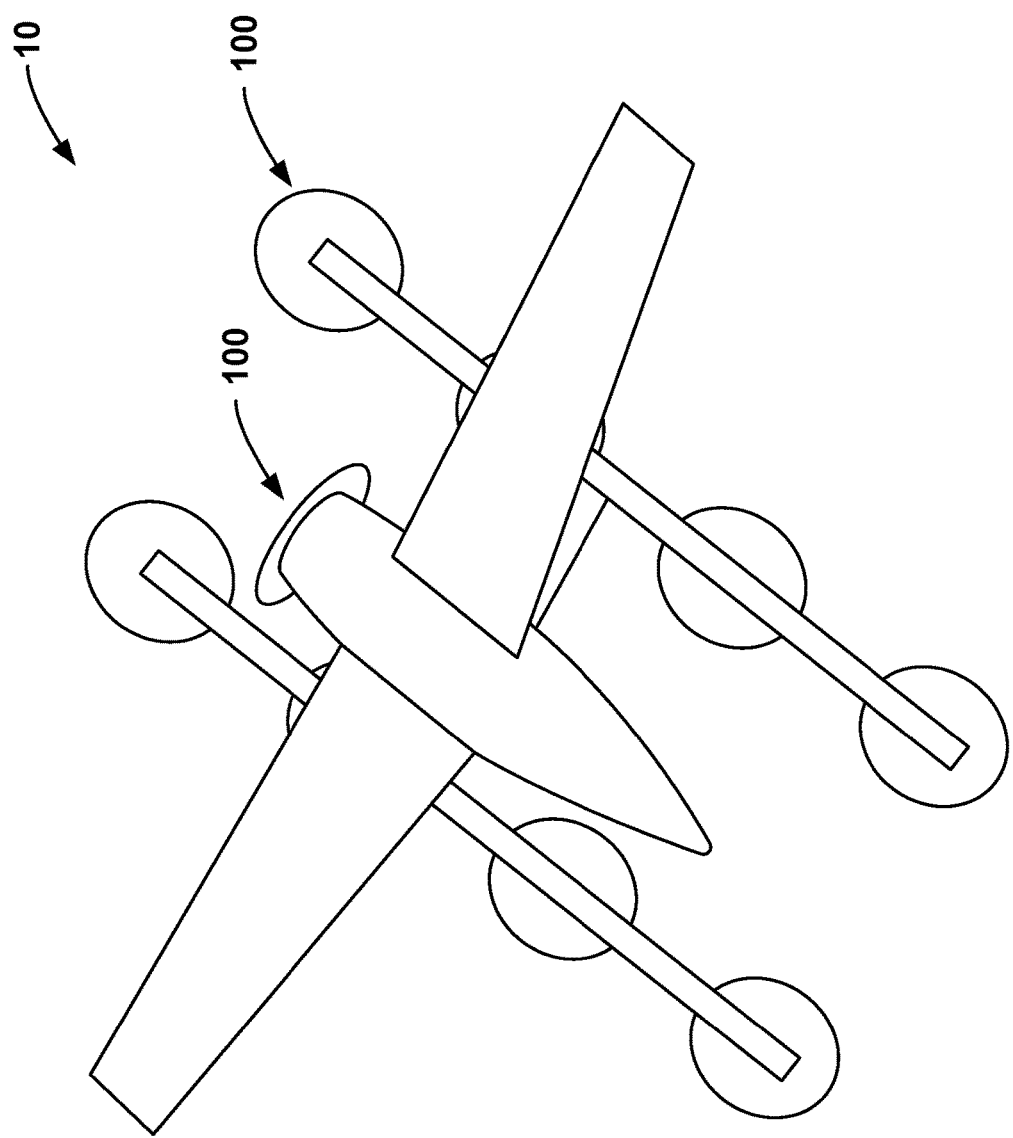
FIG. 1 is a schematic diagram of an aerial vehicle, according to an example.

FIG. 1 is a schematic diagram of the aerial vehicle 10. The aerial vehicle 10 includes nine electric motors 100. One electric motor 100 is oriented to provide horizontal thrust or lift for the aerial vehicle 10 and the other eight electric motors 100 are oriented to provide vertical thrust for the aerial vehicle 10. Other arrangements of electric motors are possible. The electric motors 100 each include the rotor 102 (not shown) that is configured to drive a plurality of propeller blades that provide force for the aerial vehicle 10. While the aerial vehicle 10 is described as an example machine implementing the electric motor described herein, any type of machines can benefit from the electric motor disclosed. Examples of suitable machines include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial machines, fulfillment center robots, supply-chain robots, robotic vehicles, mine sweepers, and the like.

Figure 2:
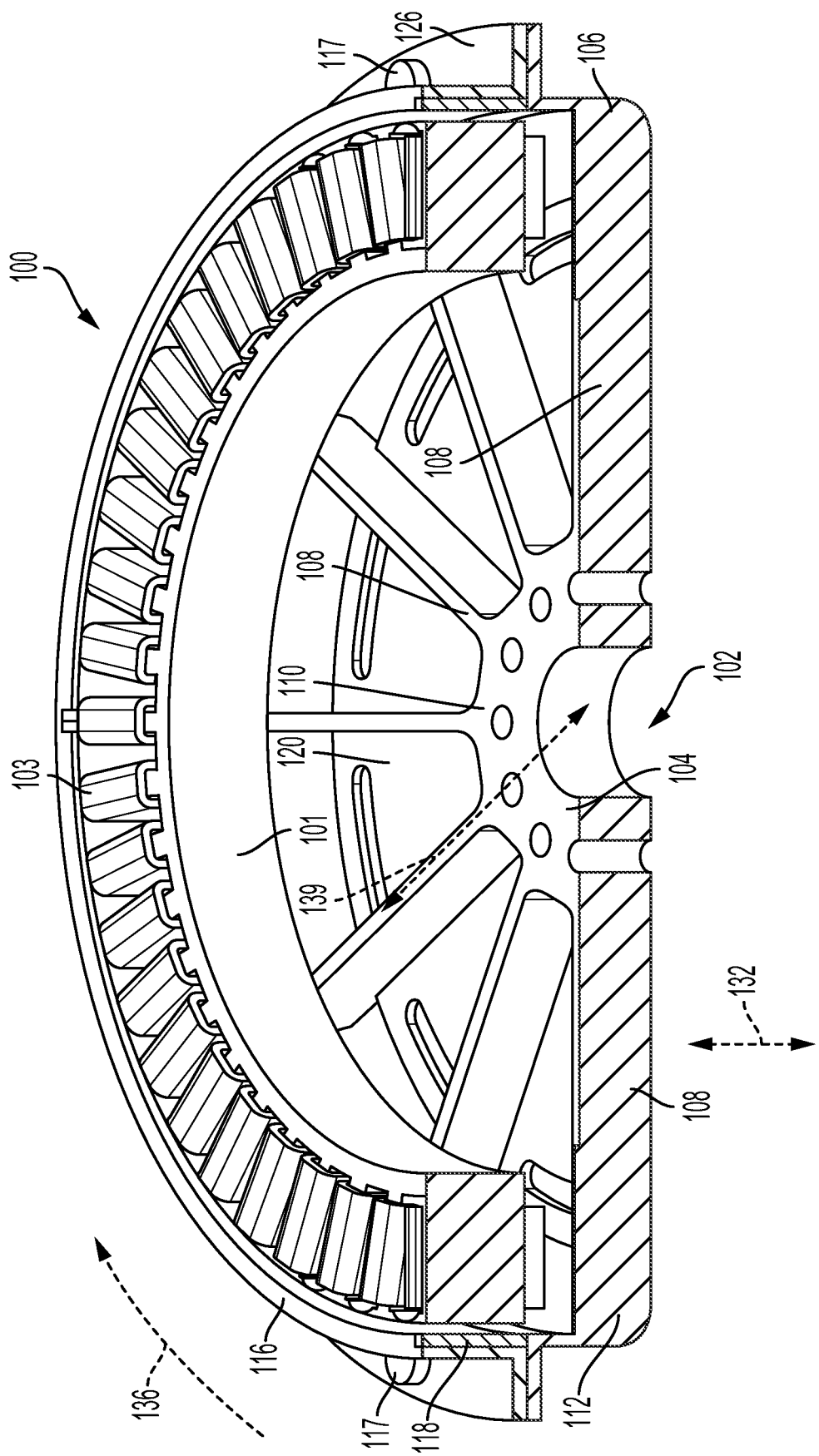
FIG. 2 is a cross sectional diagram viewing an underside of an electric motor, according to an example.

FIG. 2 is a cross sectional diagram viewing an underside of the electric motor 100. The electric motor 100 includes a stator 101 and the rotor 102. The stator 101 includes electromagnets 103 that each includes a coiled conductor that is configured to generate a magnetic field when electric current is passed through the coiled conductor. The magnetic field causes the rotor 102 to rotate during operation.

The rotor 102 includes an inner hub 104, an outer rim 106, and a plurality of slats 108. Each slat of the plurality of slats 108 has a first end 110 at the inner hub 104 and a second end 112 at the outer rim 106. The rotor 102 is configured to drive a plurality of propeller blades (not shown) that provide force for the aerial vehicle 10. Rotating the rotor 102 causes the plurality of slats 108 to force air radially outward away from the rotor 102, potentially providing a cooling effect.

The thin profile of the plurality of slats 108 in the azimuthal direction 136 can facilitate increased airflow into and out of the electric motor 100, thereby increasing heat flux away from the electric motor 100 to help cool the electromagnets 103 and/or the stator 101. This can enhance the performance of the electric motor 100.

The rotor 102 is formed of aluminum, one or more other metals, carbon fiber composite, and/or other materials. The rotor 102 includes a singular integrated component that includes the inner hub 104, the outer rim 106, a cover plate 120, and the plurality of slats 108, but in other examples the inner hub 104, the outer rim 106, the cover plate 120, and/or the plurality of slats 108 can be attached to each other with fasteners and/or adhesive, or welded together, for example. The cover plate 120 being attached to or integral with the inner hub 104, the outer rim 106, and the plurality of slats 108 provides enhanced structural strength for the rotor 102.

The rotor 102 also includes a housing 116 that is configured to hold magnets 118. The magnets 118 can be arranged in a Halbach array, for example. The magnets 118 are attracted and/or repelled by the magnetic field generated by the stator 101 to cause rotation of the rotor 102. The magnets 118 are shaped to conform to the housing 116. More details regarding the housing 116 and the magnets 118 are included below. A support ring 126 extends radially away from the housing 116 and is attached to the outer rim 106 via fasteners 117.

As shown in FIG. 2, the housing 116 is radially aligned with and attached to the outer rim 106 (e.g., via fasteners 117). The housing 116 being radially aligned with and/or attached to the outer rim 106 provides increased structural strength for the rotor 102 in the axial direction 132, the radial direction 139, and/or the azimuthal direction 136.

Figure 3:
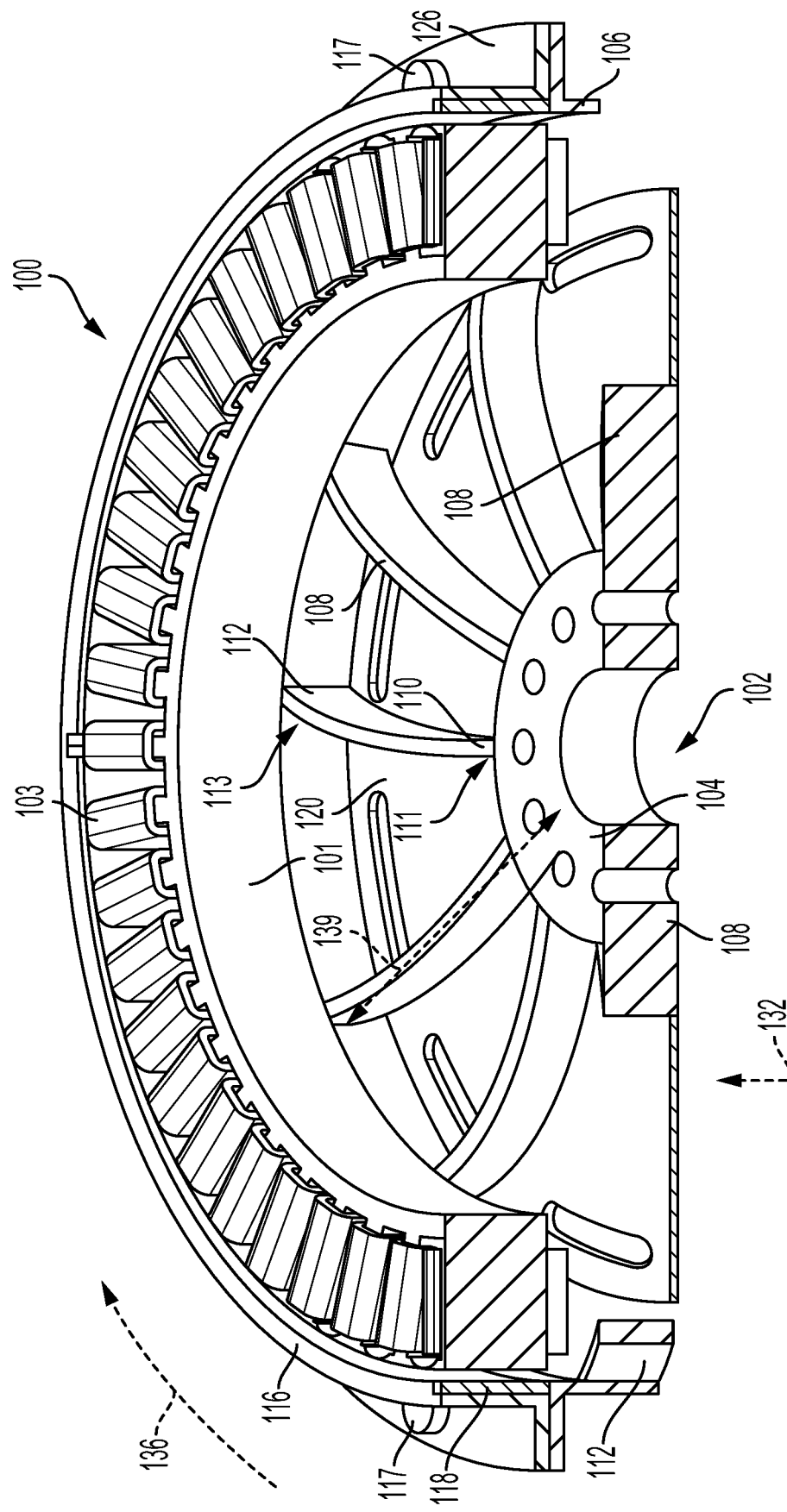
FIG. 3 is a cross sectional diagram viewing an underside of an electric motor, according to an example.

FIG. 3 is a cross sectional diagram viewing the underside of the electric motor 100. In contrast to the example shown in FIG. 2, the first end 110 and the second end 112 of each slat of the plurality of slats 108 are at different azimuthal positions. For example, the first end 110 is at a first azimuthal position 111 and the second end 112 is at a second azimuthal position 113. This feature will generally create an impeller, increasing air flow away from the rotor 102 for an enhanced cooling effect during operation.

Figure 4:
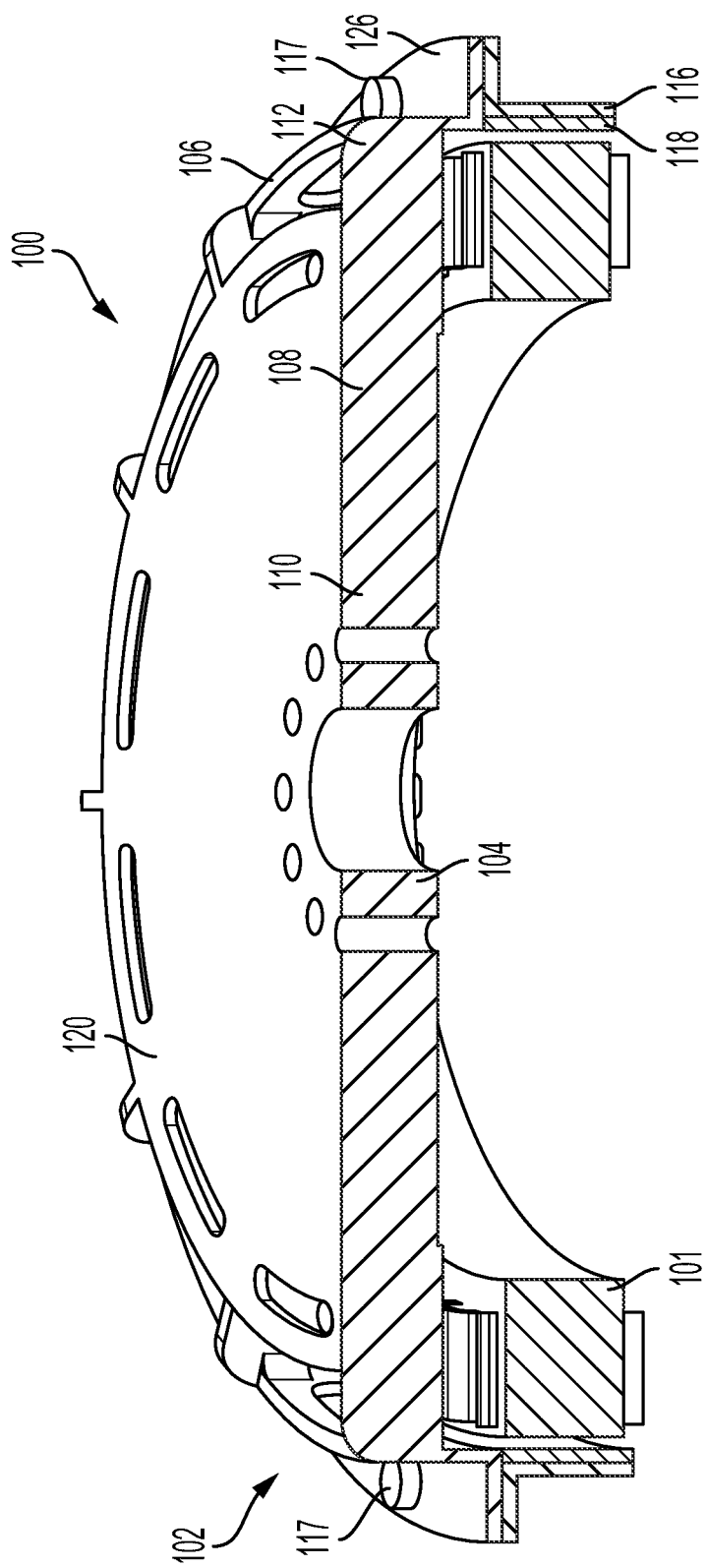
FIG. 4 is a cross sectional diagram viewing a topside of an electric motor, according to an example.

FIG. 4 is a cross sectional diagram viewing the topside of the electric motor 100 shown in FIG. 2.

Figure 5:
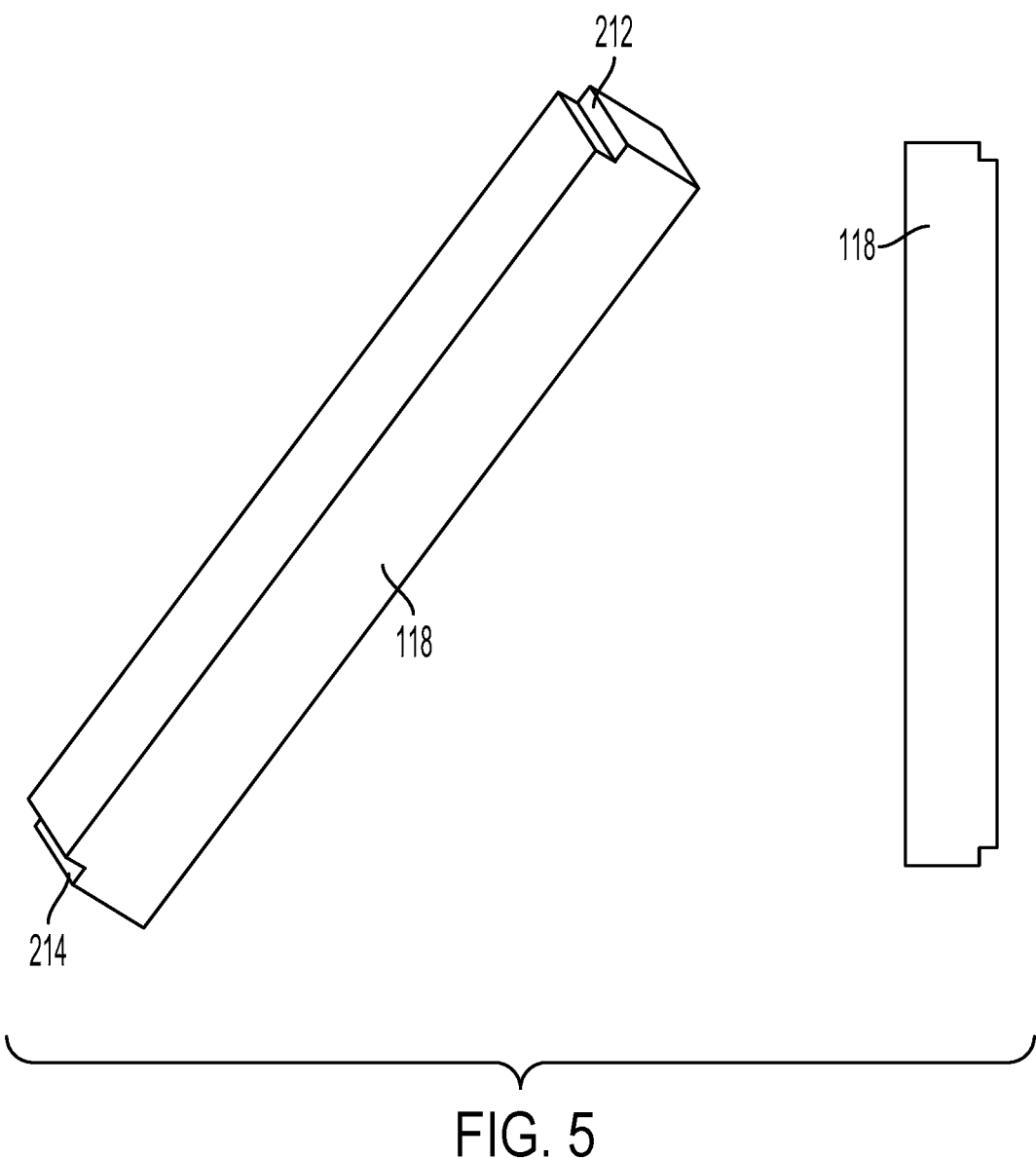
FIG. 5 shows close up views of a magnet, according to an example.

FIG. 5 shows close up views of the magnet 118. The magnet 118 has the general shape of a rectangular prism, but includes a first notch 212 and a second notch 214.

Figure 6:
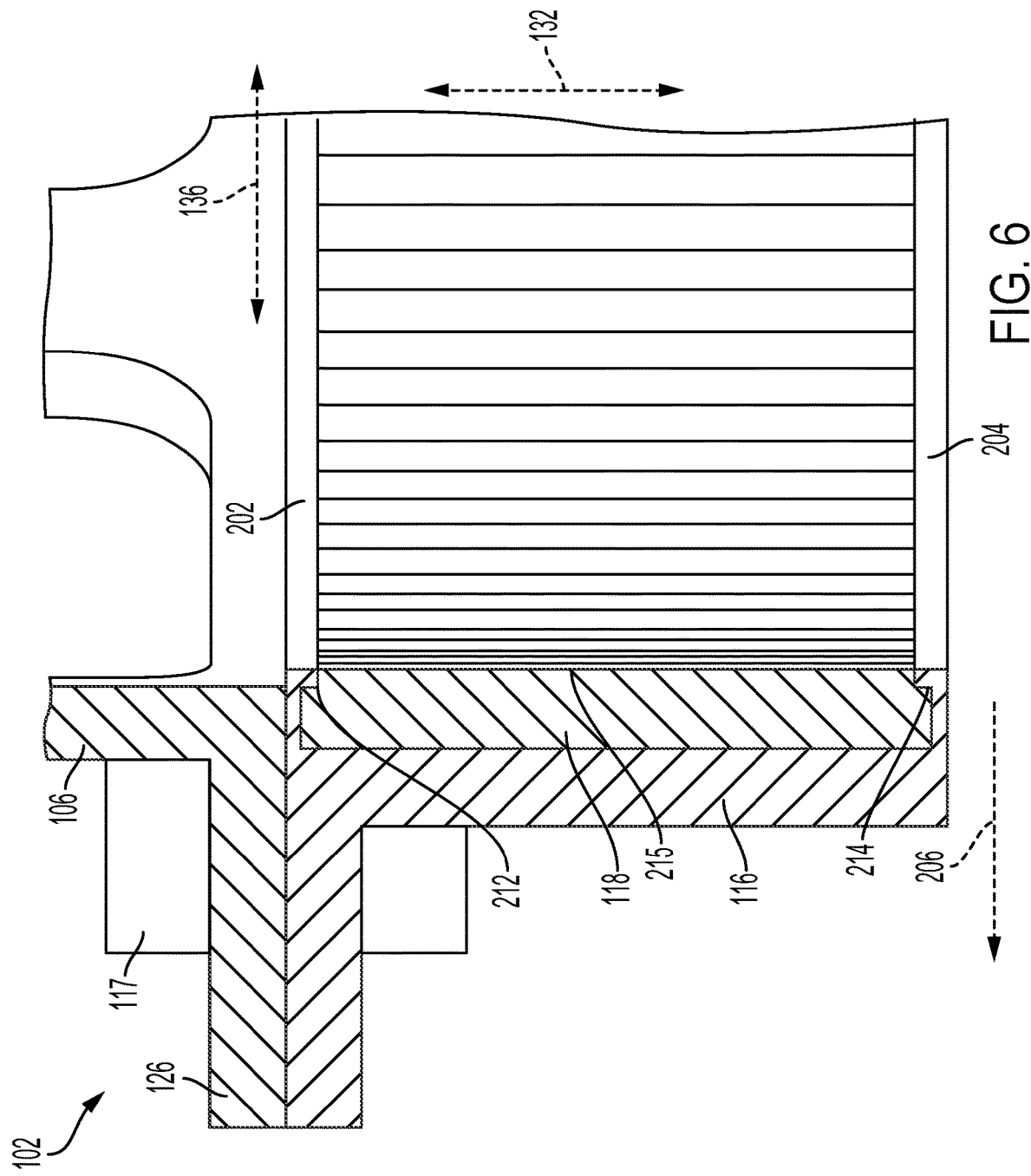
FIG. 6 is a close up view of a housing, according to an example.

FIG. 6 is a close up view of the housing 116. The rotor 102 includes the housing 116 that comprises a first retaining structure 202 and a second retaining structure 204 that are configured to apply a force 206 that is directed radially outward against the magnet 118 to hold the magnet 118 against the housing 116. The rotor 102 is configured to drive a plurality of propeller blades that provide force for the aerial vehicle 10, as discussed in more detail below.

As shown, the first retaining structure 202 and the second retaining structure 204 extend in both an axial direction 132 and in an azimuthal direction 136 over the magnets 118, which provides a more reliable attachment between the rotor 102 and the magnets 118 than in conventional designs. Additionally, the first retaining structure 202 is configured to mate with the first notch 212 of the magnet 118 and the second retaining structure 204 is configured to mate with the second notch 214 of the magnet 118, which provides a more reliable attachment between the rotor 102 and the magnets 118 than in conventional designs.

The magnet 118 being able to mate with the first retaining structure 202 and the second retaining structure 204 as described above can allow better air flow through the rotor 102 and increased mechanical strength, especially in the axial direction 132, when compared to conventional rotor designs. Additionally, a radially inward facing surface 215 of the magnets 118 being exposed to the stator 101 allows for a reduced air gap between the magnets 118 and the stator 101, which generally will increase the efficiency of the electric motor 100. This reduced air gap is enabled by the respective shapes of the first notch 212, the second notch 214, the first retaining structure 202, and the second retaining structure 204. That arrangement allows for most of the radially inward facing surface 215 of the magnets 118 to be exposed and as close to the stator 101 as reasonably possible.

Figure 7:
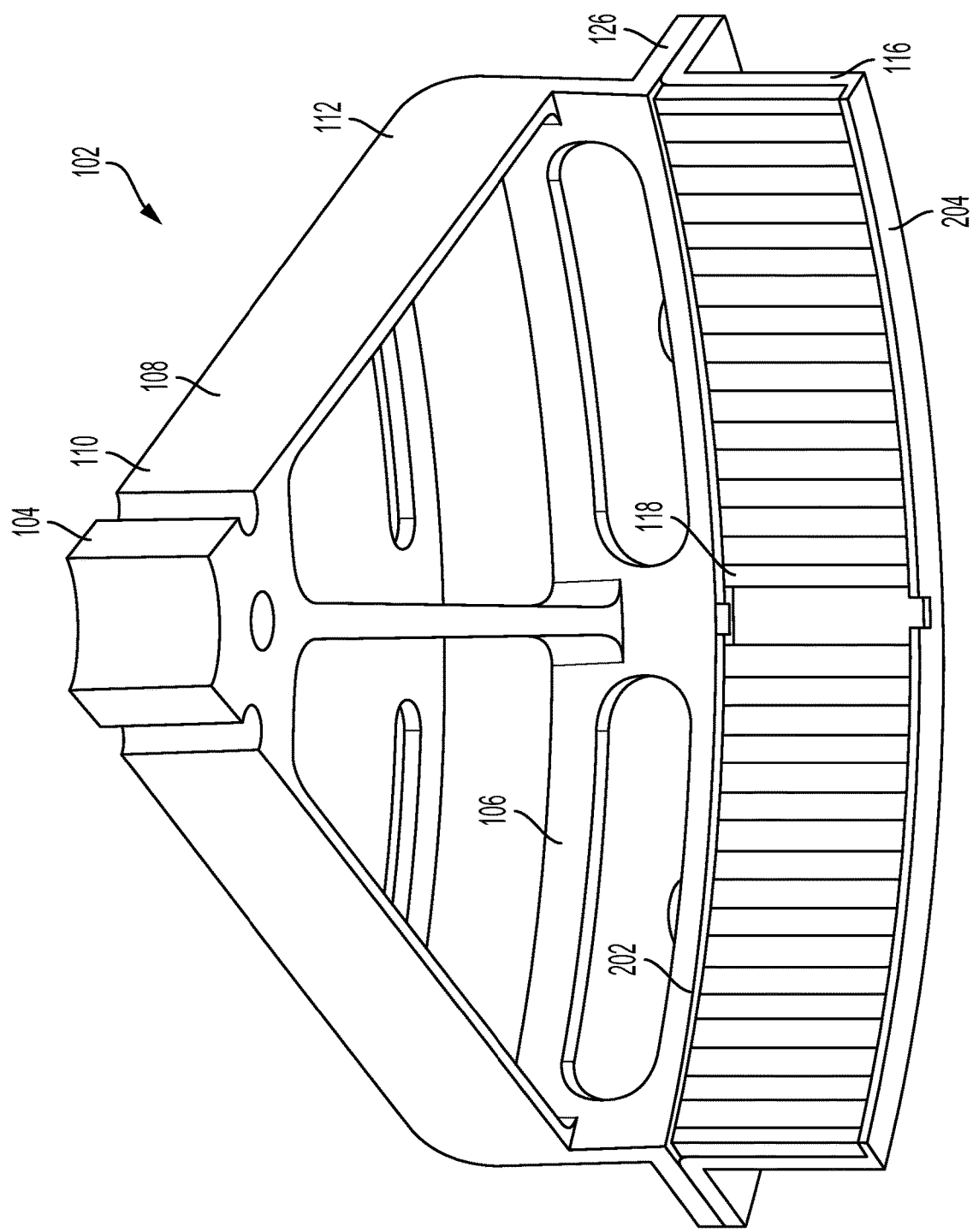
FIG. 7 is an underside cutaway view of a rotor, according to an example.

FIG. 7 is an underside cutaway view of the rotor 102.

Figure 8:
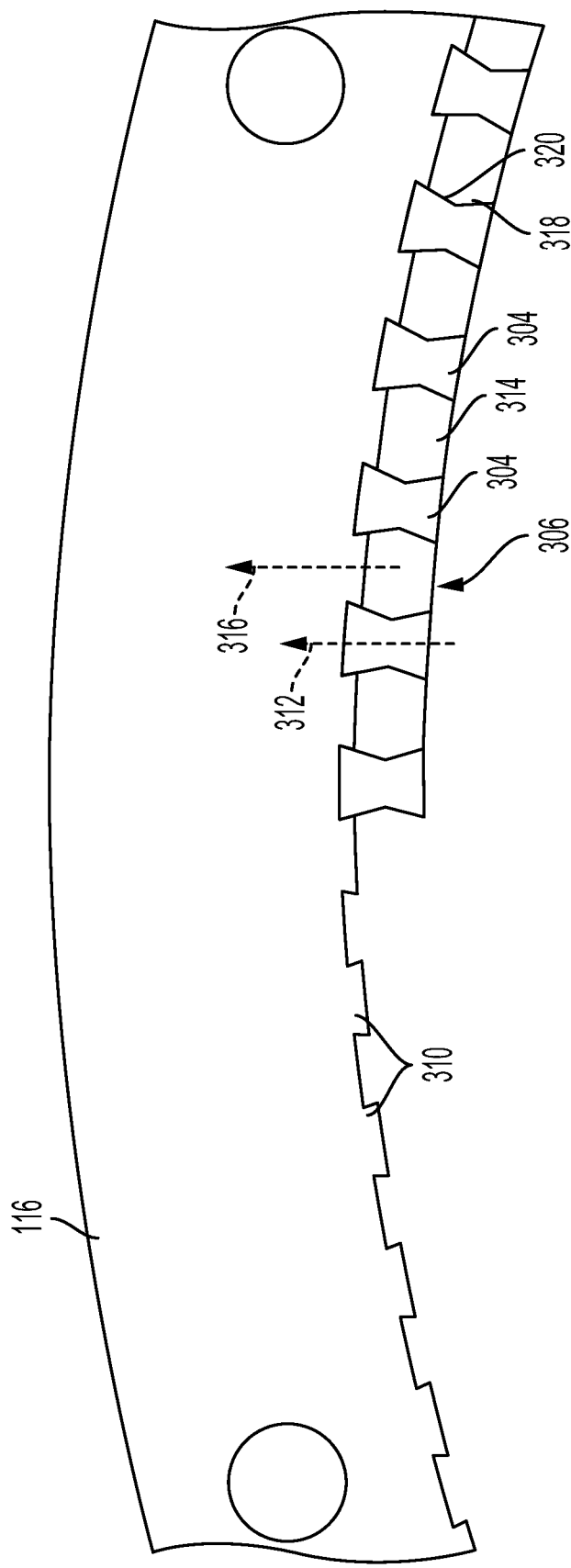
FIG. 8 is a cross sectional view of a housing, according to an example.

FIG. 8 is a cross sectional view of an alternative embodiment of the housing 116. The rotor 102 includes a first plurality of magnets 304 defining a plurality of gaps 306 between the first plurality of magnets 304. The housing 116 includes a plurality of retaining structures 310 configured to apply first forces 312 that are directed radially outward against the first plurality of magnets 304 to hold the first plurality of magnets 304 against the housing 116. The rotor 102 also includes a second plurality of magnets 314 that are positioned within the plurality of gaps 306 such that the first plurality of magnets 304 are configured to apply a second force 316 that is directed radially outward against the second plurality of magnets 314 to hold the second plurality of magnets 314 against the housing 116. Each magnet of the second plurality of magnets 314 includes a convex surface 318. Each magnet of the first plurality of magnets 304 includes a concave surface 320 that is configured to apply the second force 316 to the convex surface 318.

Figure 9:
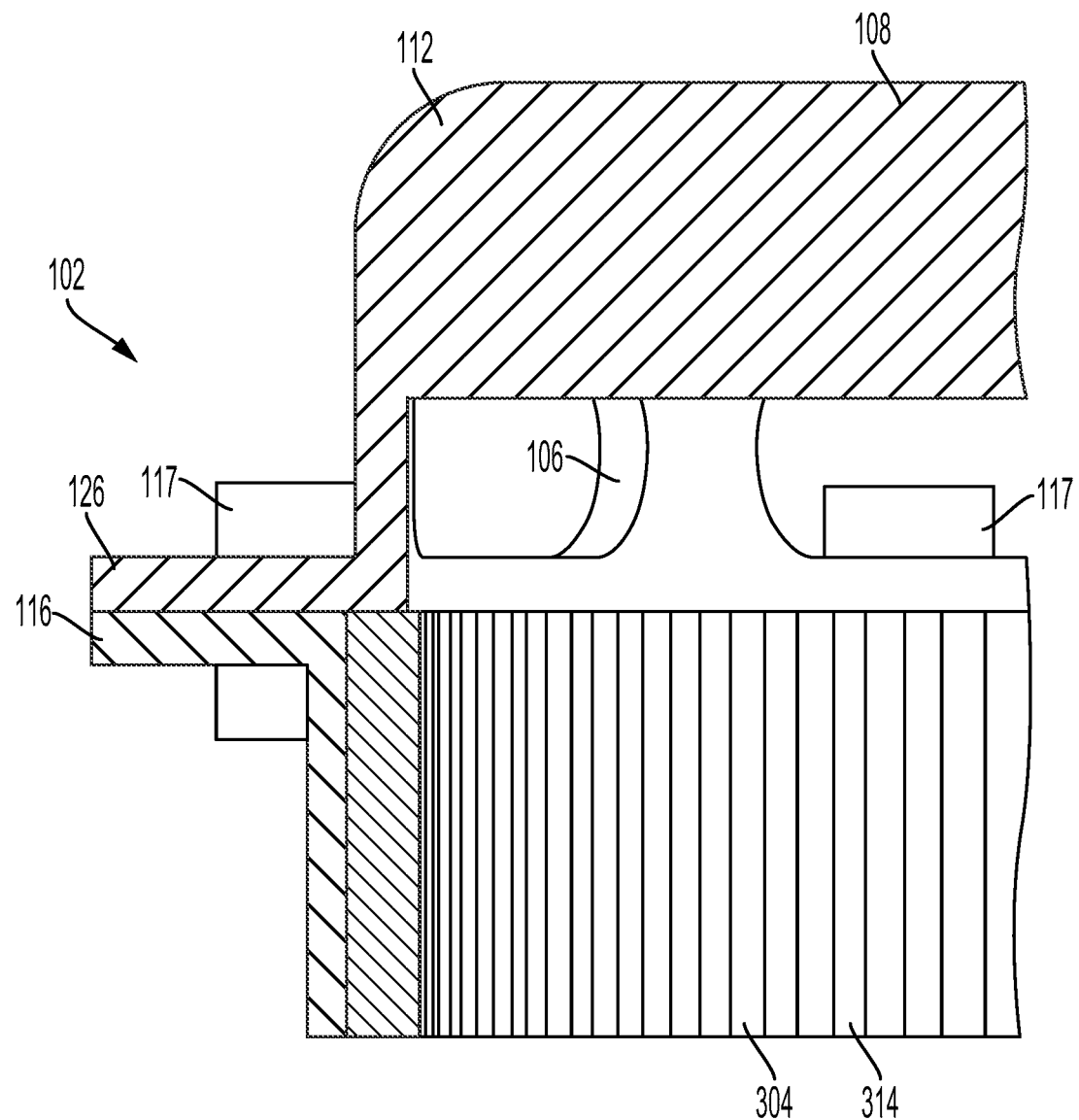
FIG. 9 is a cross sectional view of a housing, according to an example.

FIG. 9 is a cross sectional view of the housing 116 shown in FIG. 8.

Figure 10:
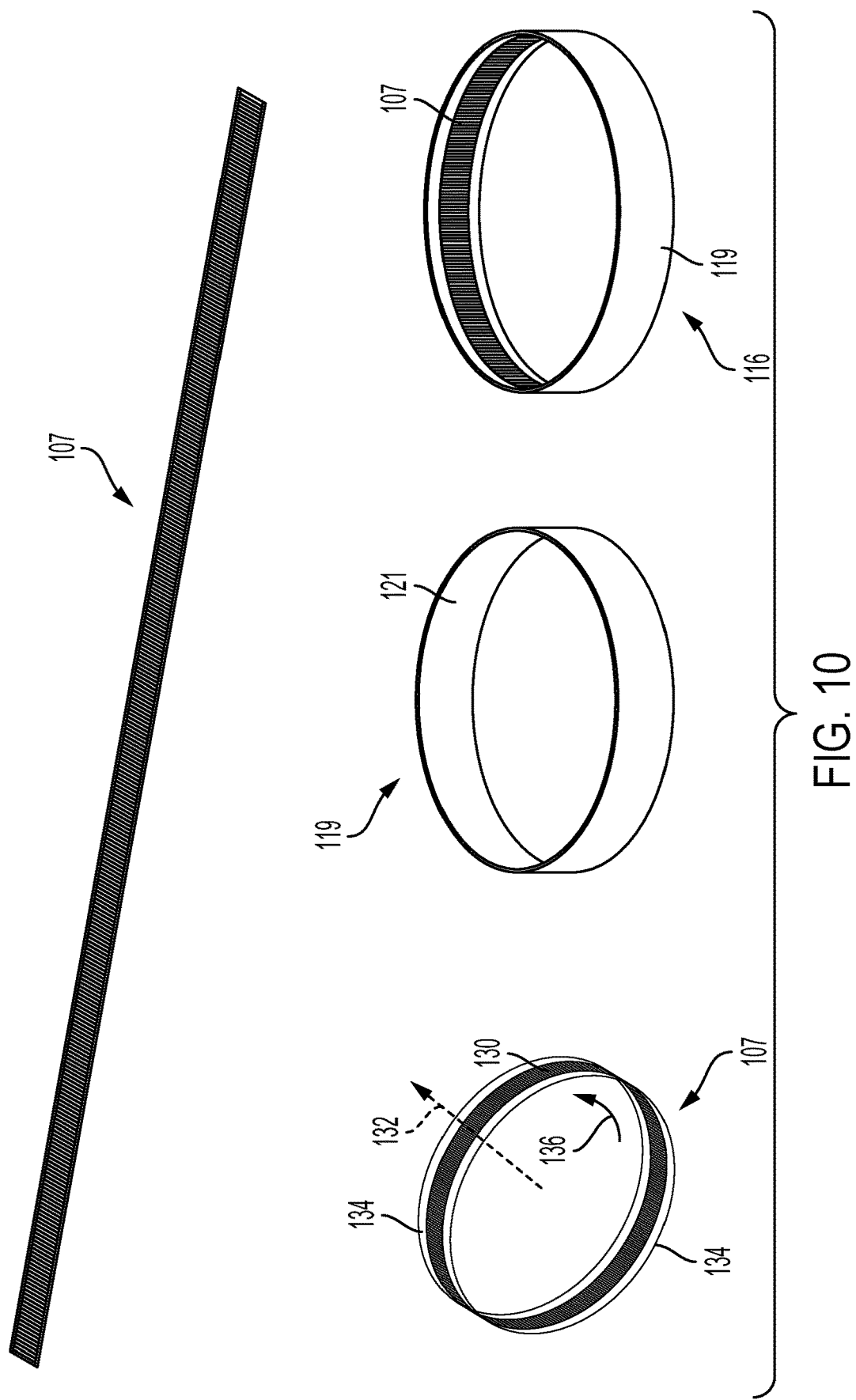
FIG. 10 shows components of a housing, according to an example.

FIG. 10 shows components of another embodiment of the housing 116. The upper panel of FIG. 10 shows a ferromagnetic assembly 107 that is composed of one or more ferromagnetic materials such as iron, nickel, or cobalt. The ferromagnetic assembly 107 can be arranged in a circular form as shown in the lower left panel of FIG. 10.

The ferromagnetic assembly 107 includes ferromagnetic rings 134 that are elongated in the azimuthal direction 136. The ferromagnetic rings 134 are configured for housing the magnets 118, as described in more detail below. The ferromagnetic assembly 107 also includes ferromagnetic strips 130 between the ferromagnetic rings 134. The ferromagnetic strips 130 are elongated in an axial direction 132 and are configured for housing the magnets 118, as described in more detail below.

In this example, the housing 116 includes a base 119 that is ring-shaped as shown in the lower center panel of FIG. 10. The base 119 can be formed with the same materials as the rotor 102, for example.

The housing 116 is shown in the lower right panel of FIG. 10. The ferromagnetic assembly 107 is disposed along an inner circumference 121 of the base 119.

Figure 11:
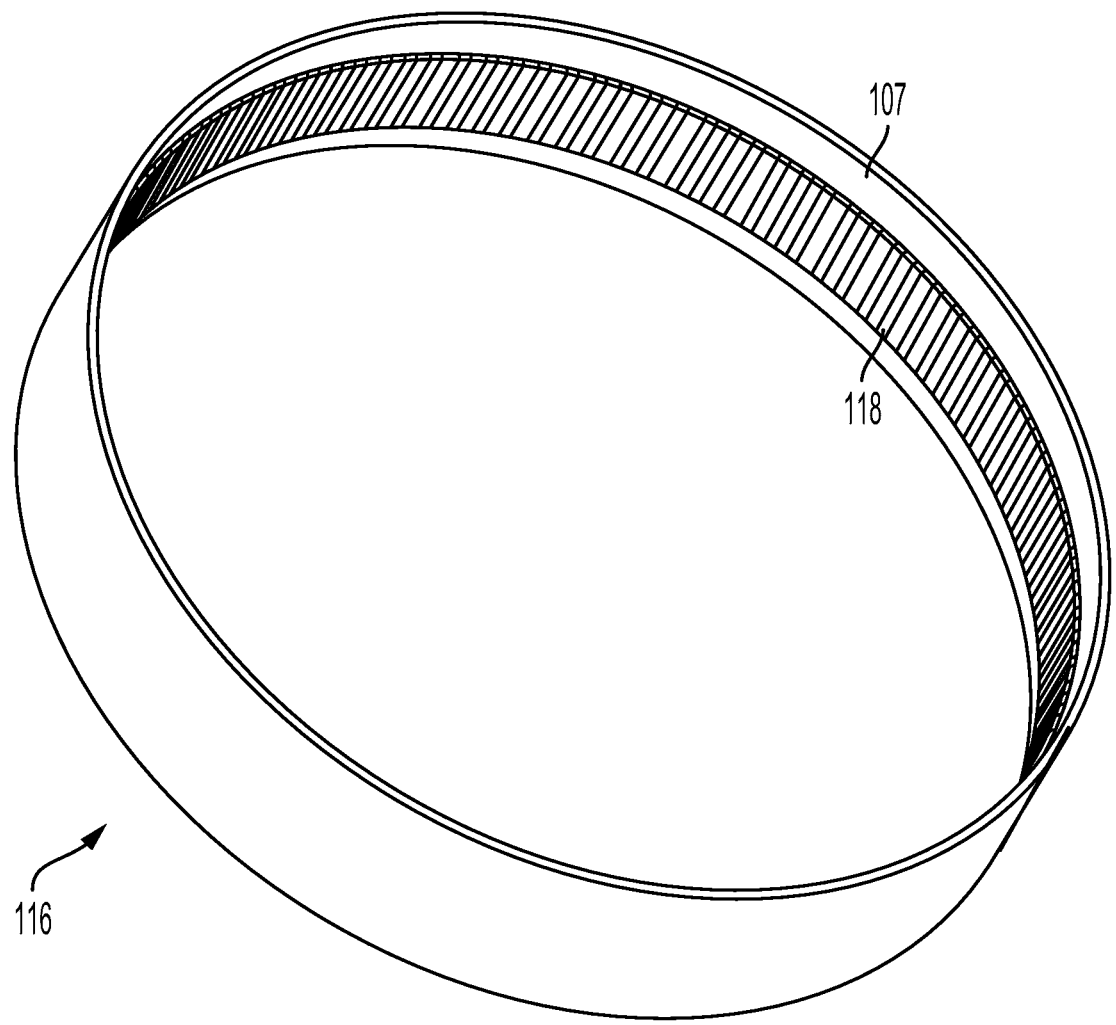
FIG. 11 is an assembled view of a housing including magnets, according to an example.

FIG. 11 is an assembled view of the housing 116 of FIG. 10 including magnets 118. The ferromagnetic assembly 107 houses the magnets 118. More specifically, the ferromagnetic assembly 107 allows for a smaller size (e.g., in the azimuthal direction) of each individual magnet 118, which can lead to better control of the magnetic flux generated by the magnets 118, leading to improved efficiency of the electric motor 100.

Figure 12A:
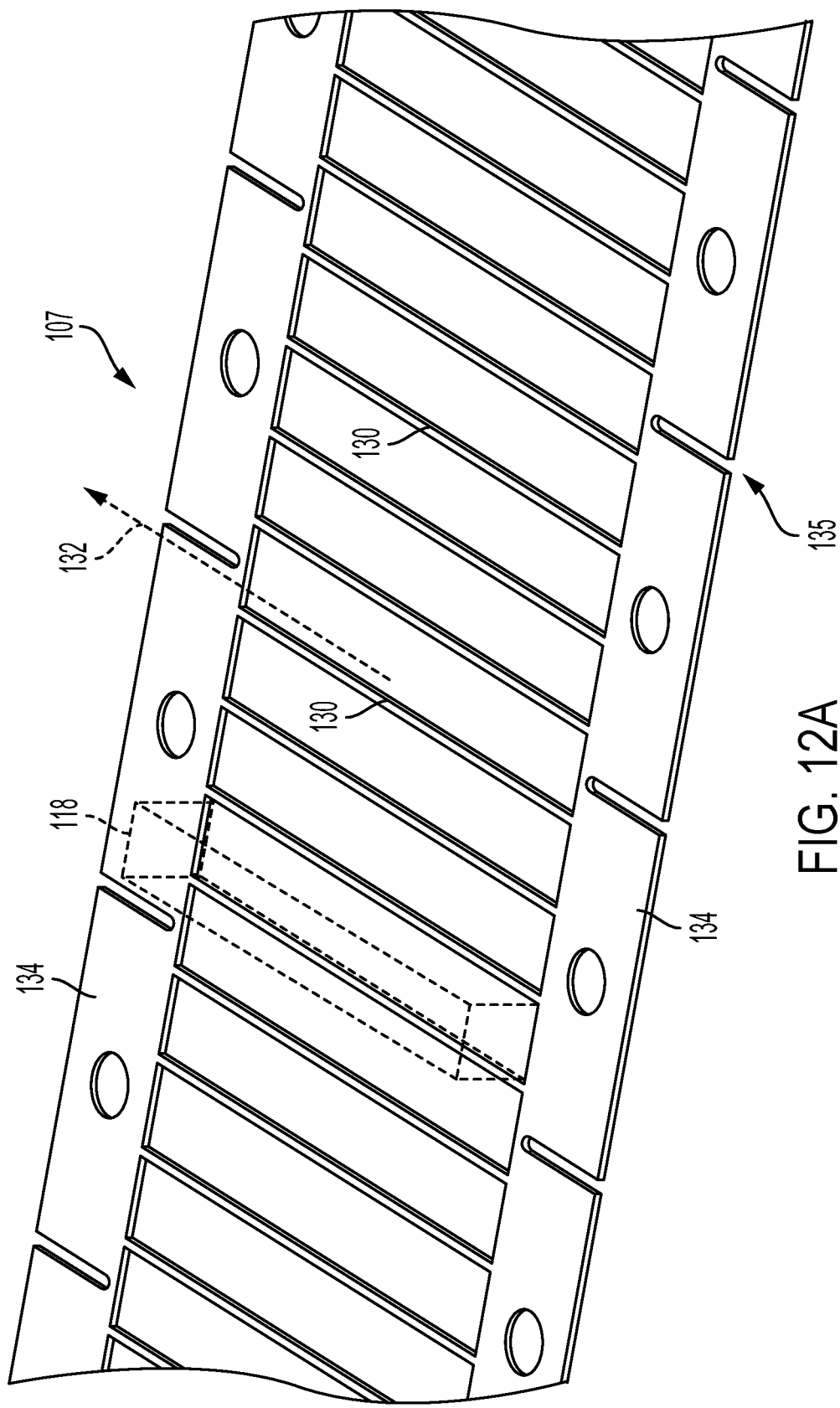
FIG. 12A is a close up view of a ferromagnetic assembly, according to an example.

FIG. 12A is a close up view of the ferromagnetic assembly 107. The ferromagnetic assembly 107 houses the magnets 118. More specifically, the magnet 118 fits snugly between adjacent ferromagnetic strips 130 of the ferromagnetic assembly 107. Additionally, the magnet 118 fits snugly between the ferromagnetic rings 134. Additionally, the magnets 118 can be secured to the housing 116 with adhesive. As shown, the ferromagnetic rings 134 include slots 135 that can compensate for thermal expansion experienced during operation of the rotor 102. The ferromagnetic rings 134 help prevent magnetic flux generated by the magnets 118 from leaking out of housing 116 in the axial direction 132. In this way, the magnetic flux generated by the magnets 118 can be more focused toward the stator 101 for enhanced efficiency of the electric motor 100.

Attaching the ferromagnetic assembly 107 to the inner radius of the inner circumference 121 of the base 119 allows for the use of a base 119 that is thinner in the radial direction and lighter, improving efficiency of the electric motor 100. That is, the base 119 could advantageously have a radial thickness that is too thin to allow for machined housing slots for housing the magnets 118 and rely on the ferromagnetic assembly 107 instead for housing the magnets 118.

Figure 12B:
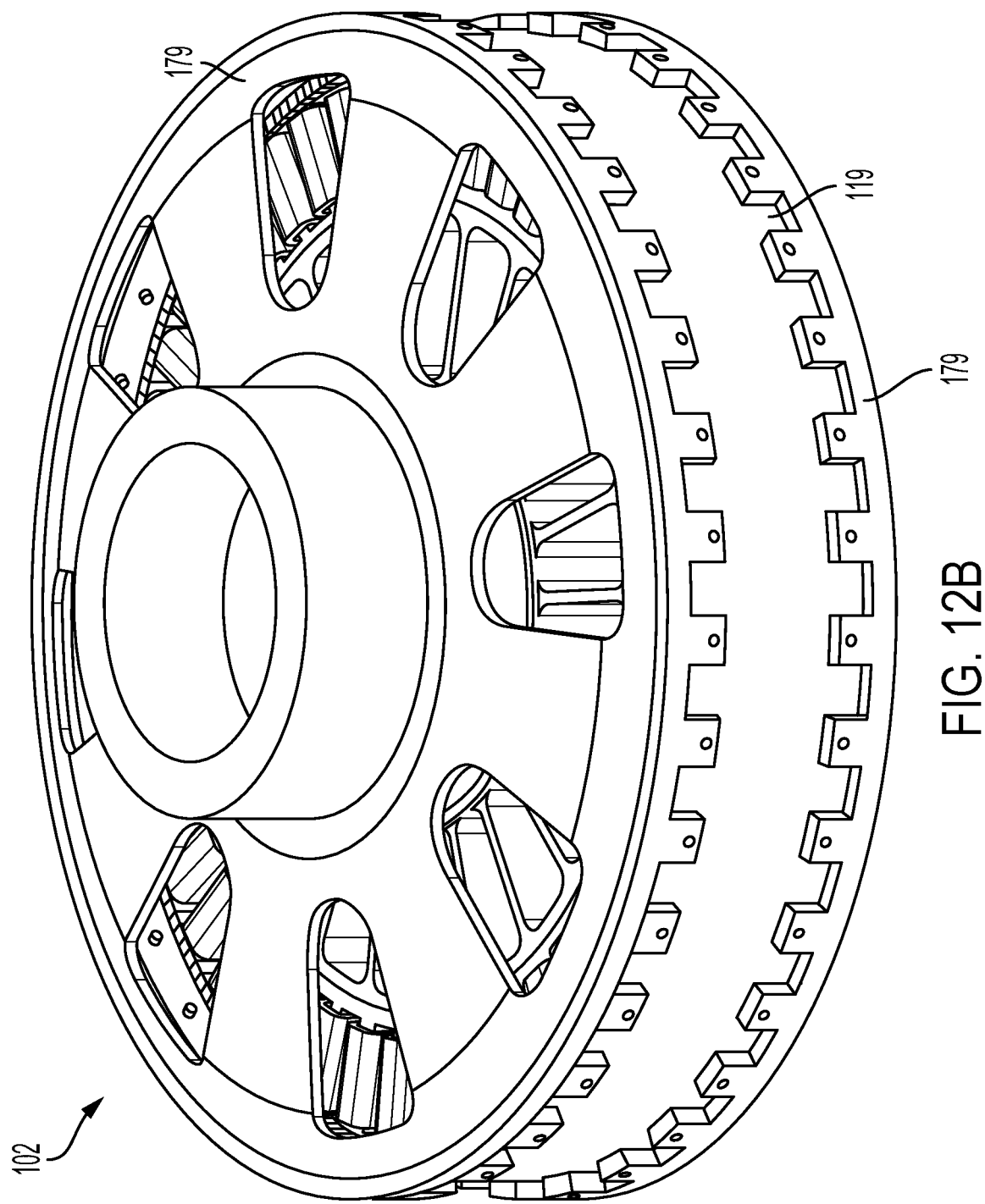
FIG. 12B is a perspective view of a rotor, according to an example.

FIG. 12B shows how the ferromagnetic assembly 107 can provide an interface for coupling (e.g., via fasteners) end caps 179 to the base 119. That is, bolts can be inserted through the end caps 179, the base 119, and the ferromagnetic assembly 107 and secured with nuts, for example.

Figure 13:
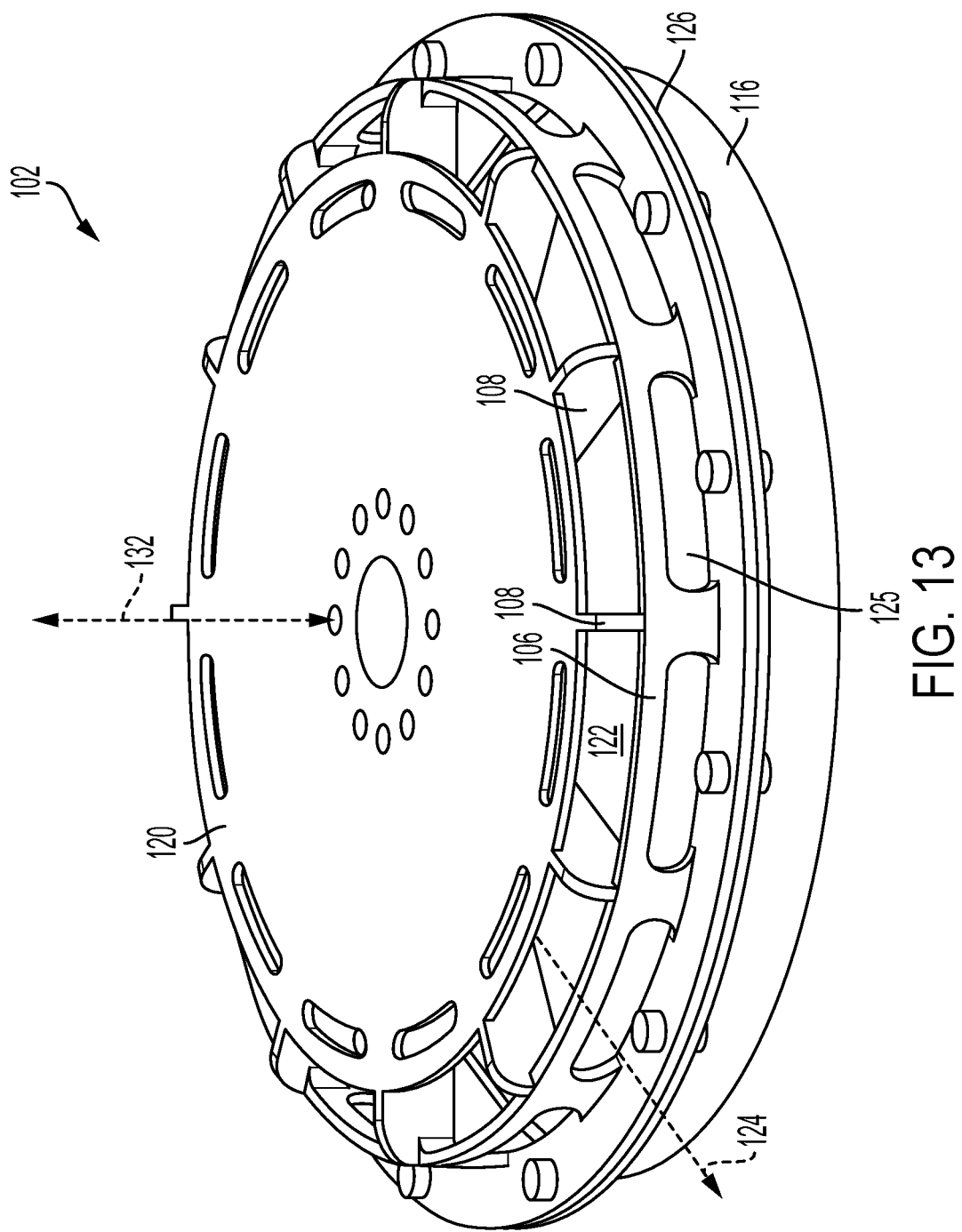
FIG. 13 is a perspective view of a rotor, according to an example.

FIG. 13 is a perspective view of the rotor 102. The cover plate 120, the outer rim 106, and the plurality of slats 108 form a plurality of openings 122 through which air 124 can flow. The rotor 102 additionally includes openings 125 within the outer rim 106 that additionally allow the air 124 to flow in the outwardly radial direction. The outer rim 106 being arranged substantially in the axial direction 132 provides additional mechanical strength to the rotor 102 in the radial and azimuthal directions. The cover plate 120 provides additional mechanical strength in the azimuthal direction.

Figure 14:
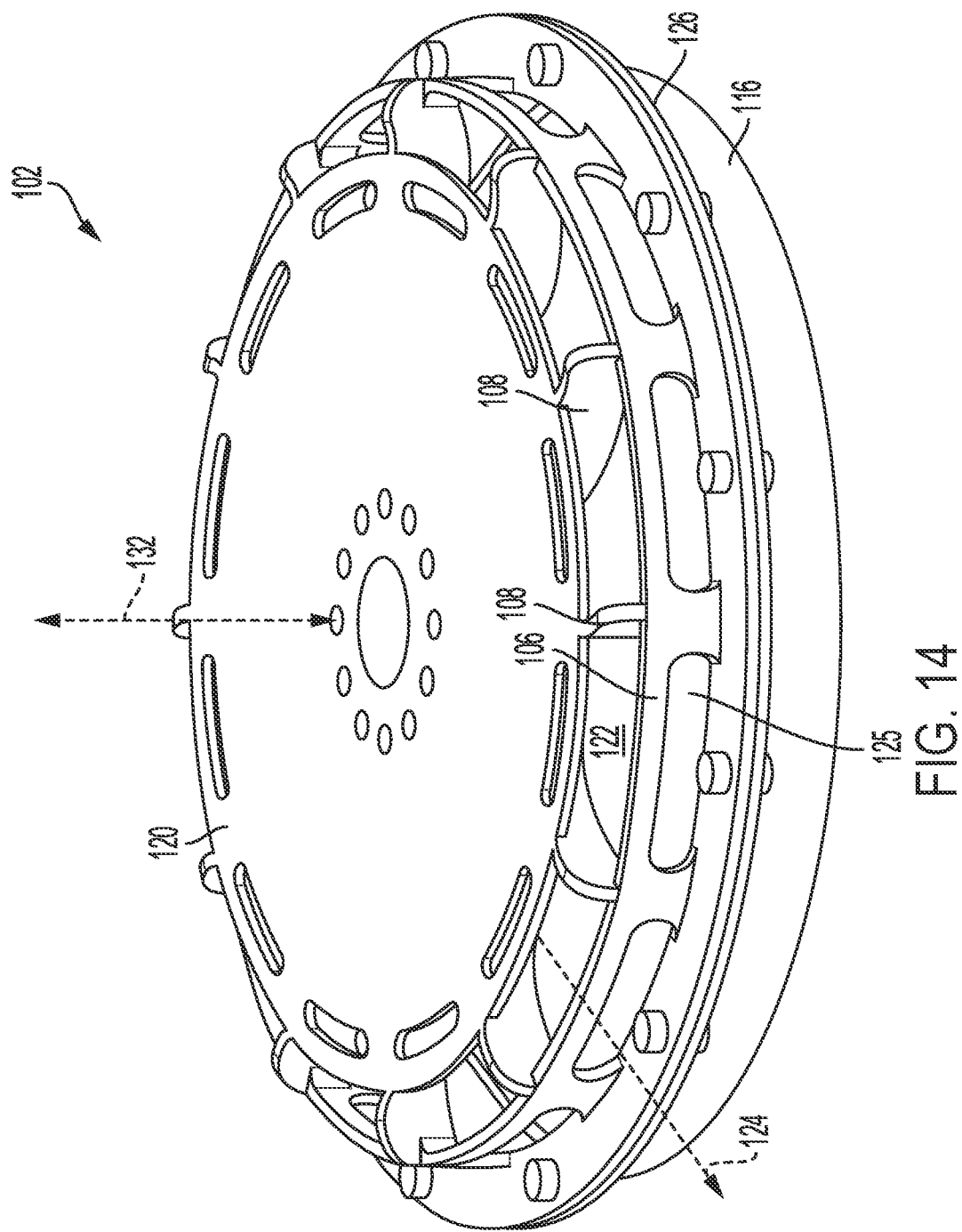
FIG. 14 is a perspective view of a rotor, according to an example.

FIG. 14 is a perspective view of the rotor 102. In this example, the first end 110 and the second end 112 of each slat of the plurality of slats 108 are at different azimuthal positions. For example, the first end 110 is at a first azimuthal position 111 and the second end 112 is at a second azimuthal position 113. This feature will generally create an impeller, increasing air flow away from the rotor 102 for an enhanced cooling effect during operation.

Figure 15:
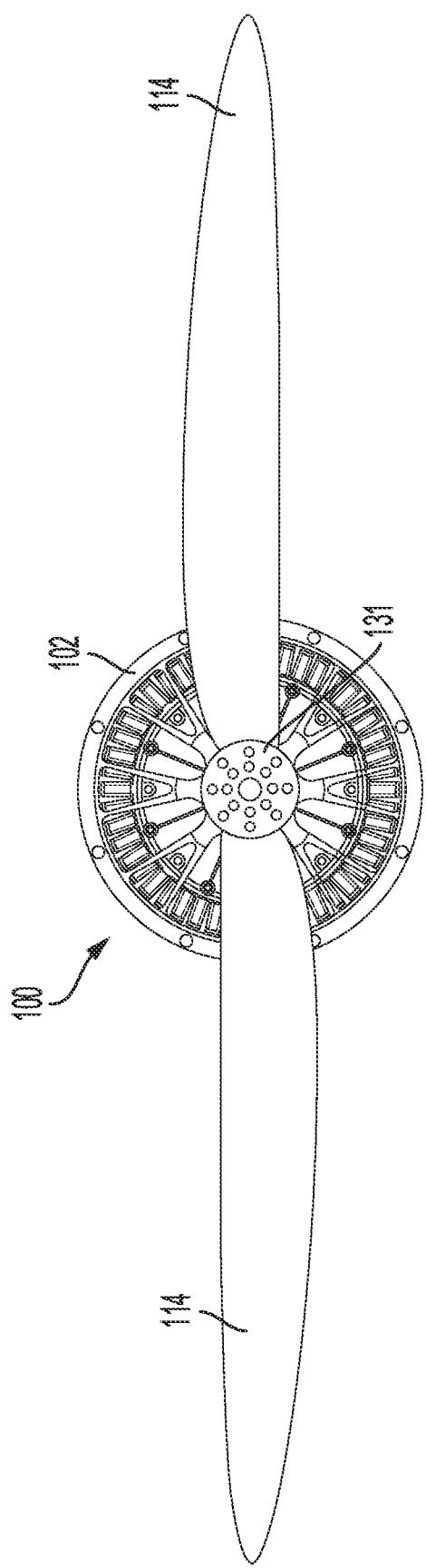
FIG. 15 is a top view of a rotor, according to an example.

FIG. 15 is a top view of the rotor 102 with propeller blades 114 attached.

Figure 16:
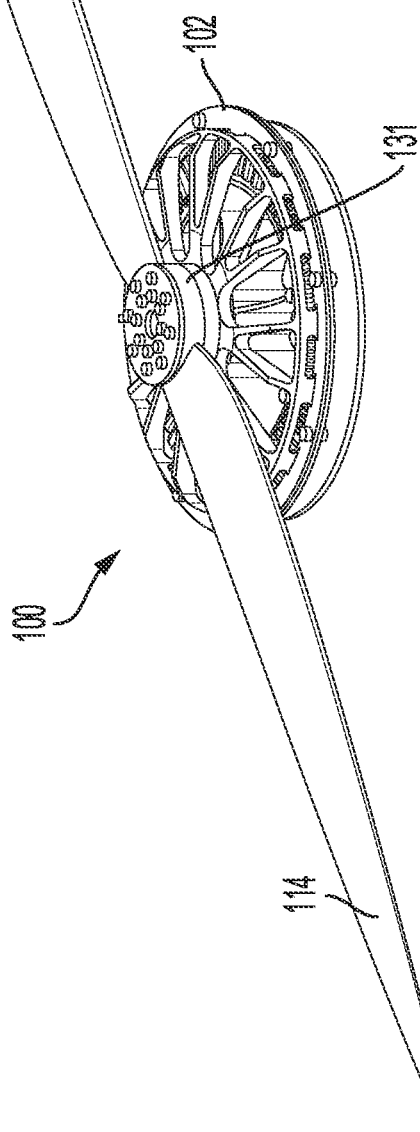
FIG. 16 is a perspective view of a rotor, according to an example.

FIG. 16 is a perspective view of the rotor 102 with propeller blades 114 attached. FIGS. 15 and 16 reflect a configuration in which the propeller blades 114 are mounted to a shaft 131 at the center of the rotor 102.

Figure 17:
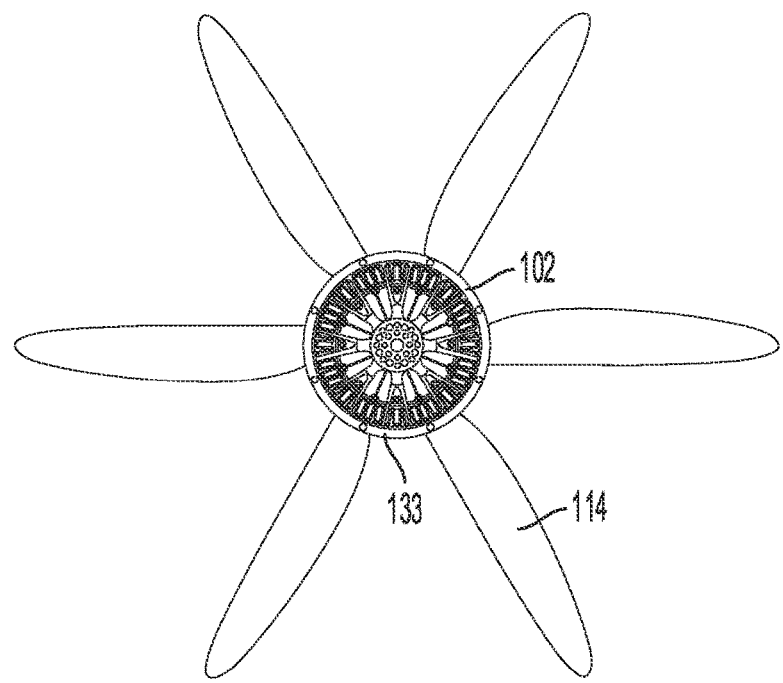
FIG. 17 is a top view of a rotor, according to an example.

FIG. 17 is a top view of the rotor 102 with propeller blades 114 attached.

Figure 18:
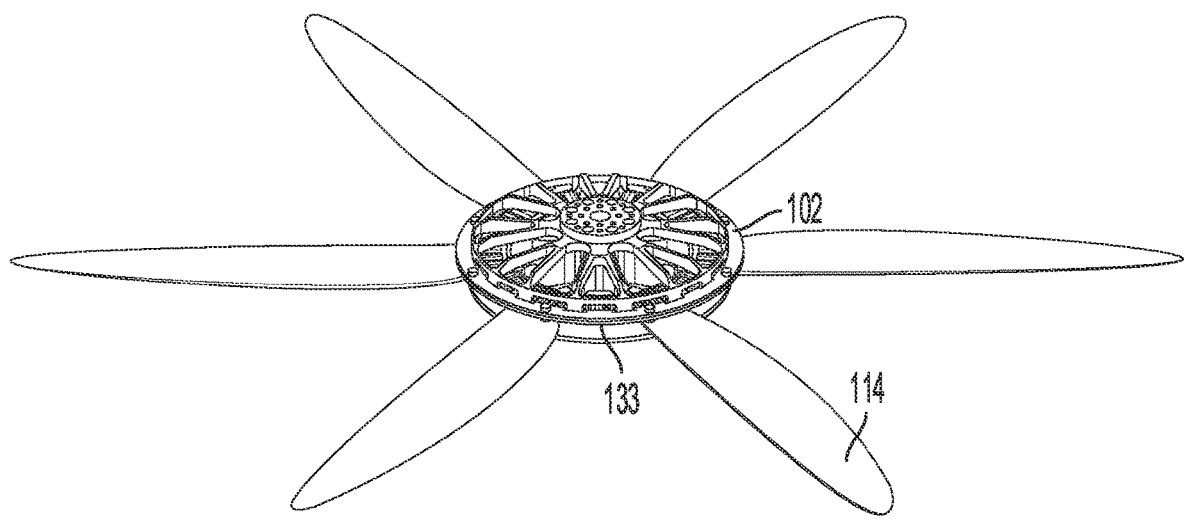
FIG. 18 is a perspective view of a rotor, according to an example.

FIG. 18 is a perspective view of the rotor 102 with propeller blades 114 attached. FIGS. 17 and 18 reflect a configuration in which the propeller blades 114 are mounted to an exterior circumference 133 of the rotor 102.

Examples of the present disclosure can thus relate to one of the enumerated clauses (ECs) listed below.

Clause 1 is a rotor for an electric motor, the rotor comprising: an inner hub; an outer rim; and a plurality of slats, wherein each slat of the plurality of slats has a first end at the inner hub and a second end at the outer rim, wherein the rotor is configured to drive a plurality of propeller blades that provide force for an aerial vehicle.

Clause 2 is the rotor of Clause 1, further comprising a housing configured to hold magnets.

Clause 3 is the rotor of Clause 2, wherein the housing is radially aligned with the outer rim.

Clause 4 is the rotor of Clause 2 or Clause 3, wherein the housing is attached to the outer rim.

Clause 5 is the rotor of any of Clauses 2-4, wherein the magnets are shaped to conform to the housing.

Clause 6 is the rotor of any of Clauses 1-5, further comprising: a housing comprising a plurality of ferromagnetic strips that are elongated in an axial direction and configured for housing a plurality of magnets.

Clause 7 is the rotor of any of Clauses 1-6, further comprising: a housing comprising a ferromagnetic ring that is elongated in an azimuthal direction and configured for housing a plurality of magnets.

Clause 8 is the rotor of Clause 7, wherein the ferromagnetic ring is configured to reduce axial magnetic flux generated by the plurality of magnets beyond the ferromagnetic ring in the axial direction.

Clause 9 is the rotor of any of Clauses 1-8, wherein rotating the rotor causes the plurality of slats to force air radially outward away from the rotor.

Clause 10 is the rotor of any of Clauses 1-9, wherein the first end and the second end are at different azimuthal positions.

Clause 11 is the rotor of any of Clauses 1-10, further comprising a cover plate, wherein the cover plate, the outer rim, and the plurality of slats form a plurality of openings through which air can flow.

Clause 12 is the rotor of any of Clauses 1-11, further comprising a cover plate, wherein the inner hub is attached to the cover plate.

Clause 13 is the rotor of any of Clauses 1-12, further comprising a cover plate, wherein the plurality of slats is attached to the cover plate.

Clause 14 is a rotor for an electric motor, the rotor comprising: a housing comprising a first retaining structure and a second retaining structure that are configured to apply a force that is directed radially outward against a magnet to hold the magnet against the housing, wherein the rotor is configured to drive a plurality of propeller blades that provide force for an aerial vehicle.

Clause 15 is the rotor of Clause 14, wherein the first retaining structure is configured to extend in an axial direction over the magnet.

Clause 16 is the rotor of Clause 15, wherein the second retaining structure is configured to extend in the axial direction over the magnet.

Clause 17 is the rotor of any of Clauses 14-16, wherein the first retaining structure is configured to extend in an azimuthal direction over the magnet.

Clause 18 is the rotor of any of Clauses 14-17, wherein the second retaining structure is configured to extend in the azimuthal direction over the magnet.

Clause 19 is the rotor of any of Clauses 14-18, wherein the first retaining structure is configured to mate with a first notch of the magnet and the second retaining structure is configured to mate with a second notch of the magnet.

Clause 20 is a rotor for an electric motor, the rotor comprising: a first plurality of magnets defining a plurality of gaps between the first plurality of magnets; a housing comprising a plurality of retaining structures configured to apply first forces that are directed radially outward against the first plurality of magnets to hold the first plurality of magnets against the housing; and a second plurality of magnets that are positioned within the plurality of gaps such that the first plurality of magnets are configured to apply a second force that is directed radially outward against the second plurality of magnets to hold the second plurality of magnets against the housing.

Clause 21 is the rotor of Clause 20, wherein each magnet of the second plurality of magnets includes a convex surface, and wherein each magnet of the first plurality of magnets includes a concave surface that is configured to apply the second force to the convex surface.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A rotor for an electric motor, the rotor comprising:
   an inner hub;
   an outer rim positioned distally in a radial direction from the inner hub;
   a plurality of slats, wherein each slat of the plurality of slats has a first end at the inner hub and a second end at the outer rim; and
   a housing comprising:
   a base formed of aluminum or carbon fiber composite; and
   a ferromagnetic assembly comprising one or more ferromagnetic materials, wherein the ferromagnetic assembly is attached to the base and configured to hold one or more magnets such that the one or more magnets are longer in an axial direction than in the radial direction, wherein the ferromagnetic assembly comprises a plurality of slots that are longer in the axial direction than in the radial direction and configured to compensate for thermal expansion experienced during operation of the rotor,
   wherein the rotor is configured to drive a plurality of propeller blades that provide force for an aerial vehicle.

2. The rotor of claim 1, wherein the housing is radially aligned with the outer rim.

3. The rotor of claim 1, wherein the housing is attached to the outer rim.

4. The rotor of claim 1, wherein the ferromagnetic assembly is configured to hold the one or more magnets such that first slots of the plurality of slots are positioned at first axial ends of the one or more magnets and second slots of the plurality of slots are positioned at second axial ends of the one or more magnets, wherein the first axial ends are opposite the second axial ends in the axial direction.

5. The rotor of claim 1, wherein the ferromagnetic assembly comprises:
   a plurality of ferromagnetic strips that are elongated in the axial direction and configured for housing the one or more magnets.

6. The rotor of claim 1, wherein the ferromagnetic assembly comprises:
   a ferromagnetic ring that is elongated in an azimuthal direction and configured for housing the one or more magnets.

7. The rotor of claim 6, wherein the ferromagnetic ring is configured to reduce axial magnetic flux generated by the one or more magnets beyond the ferromagnetic ring in the axial direction.

8. The rotor of claim 1, wherein rotating the rotor causes the plurality of slats to force air radially outward away from the rotor.

9. The rotor of claim 1, further comprising a cover plate, wherein the cover plate, the outer rim, and the plurality of slats form a plurality of openings through which air can flow.

10. The rotor of claim 1, further comprising a cover plate, wherein the inner hub is attached to the cover plate.

11. The rotor of claim 1, further comprising a cover plate, wherein the plurality of slats is attached to the cover plate.

12. A rotor for an electric motor, the rotor comprising:
a housing comprising a first retaining surface that faces radially outward and a second retaining surface that faces radially outward; and
a plurality of magnets disposed in contact with the first retaining surface and the second retaining surface,
wherein the first retaining surface and the second retaining surface are configured to apply a force that is directed radially outward against the plurality of magnets to hold the magnets against the housing, and
wherein the plurality of magnets respectively comprise a plurality of notch surfaces that face radially inward, wherein the first retaining surface is an annular surface that makes contact with the plurality of notch surfaces, and wherein the plurality of notch surfaces are at first ends of the plurality of magnets.

13. The rotor of claim 12, wherein the first retaining surface extends in an axial direction over the plurality of magnets and extends in an azimuthal direction over the plurality of magnets.

14. The rotor of claim 13, wherein the second retaining surface extends in the axial direction over the plurality of magnets.

15. The rotor of claim 13, wherein the second retaining surface extends in the azimuthal direction over the plurality of magnets.

16. The rotor of claim 12, wherein the first retaining surface is configured to mate with first notches of the plurality of magnets and the second retaining surface is configured to mate with second notches of the plurality of magnets.

17. The rotor of claim 12, further comprising an outer rim, wherein the housing is radially aligned with the outer rim.

18. The rotor of claim 17, wherein the housing is attached to the outer rim.

19. The rotor of claim 5, wherein each slot of the plurality of slots comprises an open end and a closed end that is closer to the plurality of ferromagnetic strips than the open end.

20. The rotor of claim 12, wherein the plurality of magnets respectively comprise a plurality of additional notch surfaces that face radially inward.

21. The rotor of claim 20, wherein the second retaining surface is an additional annular surface that makes contact with the additional notch surfaces, wherein the additional notch surfaces are at second ends of the plurality of magnets that are opposite the first ends.

* * * * *